United States Patent [19]
Benedek et al.

[11] Patent Number: 5,645,413
[45] Date of Patent: Jul. 8, 1997

[54] LOW $NO_x$ STAGED-AIR COMBUSTION CHAMBERS

[75] Inventors: Karen R. Benedek, Winchester; Philip C. Carbone, Groveland; Bo-Xiong He, Newton; Peter J. Loftus, Somerville, all of Mass.; Charles E. Benson, Windham, N.H.

[73] Assignee: Gas Research Institute, Chicago, Ill.

[21] Appl. No.: 376,114

[22] Filed: Jan. 20, 1995

[51] Int. Cl.[6] ........................ F23L 17/00
[52] U.S. Cl. ............... 431/116; 431/9; 431/10; 431/7; 126/390
[58] Field of Search ............ 431/9, 10, 7, 115, 431/116, 165; 126/512, 390

[56] References Cited

U.S. PATENT DOCUMENTS

| | | |
|---|---|---|
| 3,957,420 | 5/1976 | Asai et al. .................. 431/175 |
| 4,021,186 | 5/1977 | Tenner . |
| 4,054,028 | 10/1977 | Kawaguchi . |
| 4,403,941 | 9/1983 | Okiura et al. . |
| 4,525,141 | 6/1985 | DeWerth et al. .............. 431/347 |
| 4,629,415 | 12/1986 | DeWerth et al. . |
| 5,002,483 | 3/1991 | Becker . |
| 5,052,919 | 10/1991 | Becker . |
| 5,139,414 | 8/1992 | Nakamoto et al. . |

FOREIGN PATENT DOCUMENTS

| | | |
|---|---|---|
| 0187441 | 7/1986 | European Pat. Off. . |
| 0488481 | 6/1992 | European Pat. Off. . |
| 3916142 | 11/1989 | Germany . |
| 4302847 | 8/1994 | Germany . |

Primary Examiner—Larry Jones
Attorney, Agent, or Firm—Speckman, Pauley & Fejer

[57] ABSTRACT

A method and apparatus for low $NO_x$ combustion in natural draft combustion chambers comprising staged-air combustion apparatus and process in which a fuel-rich, fuel/air mixture is introduced through a burner into a combustion chamber, forming a fuel-rich primary combustion zone flame. The fuel-rich primary combustion zone flame is attached to a flame guide disposed substantially parallel to the longitudinal axis of the primary combustion zone flame and extending from behind the burner. The flame guide also provides for removal of heat from the primary combustion zone flame. Secondary combustion air is introduced into the combustion chamber downstream of the burner to complete combustion of the fuel-rich primary combustion zone flame products. Internal recirculation of combustion gases within the combustion chamber into the fuel-rich primary combustion zone flame stabilize the fuel-rich primary combustion zone flame and contribute to emissions reduction.

19 Claims, 5 Drawing Sheets

LOW $NO_x$ STAGED-AIR COMBUSTION CHAMBERS

BACKGROUND OF THE INVENTION

1. Field of the Invention

This invention relates to a method and apparatus for low $NO_x$, staged-air combustion within a combustion chamber in which the flame from said combustion is controlled in a manner which substantially reduces the entrainment of secondary combustion air into the root of the flame.

2. Description of Prior Art

The reduction of $NO_x$ emissions from combustion processes and apparatus is a long standing, major environmental objective. As a result, numerous strategies for reducing the $NO_x$ emissions from combustion processes have been developed. One such strategy is the use of staged combustion in which the fuel or combustion air is introduced into the combustion apparatus in two or more stages thereby maintaining flame temperature below a threshold temperature required for significant formation of $NO_x$ in the combustion process. U.S. Pat. No. 4,021,186, for example, teaches a forced draft burner operating at below stoichiometric mixtures of air and fuel in a primary combustion chamber and completion of the combustion by injection of secondary air near the outlet of the combustion chamber to reduce $NO_x$ produced by combustion of nitrogen-containing fuels.

U.S. Pat. No. 4,403,941 teaches a combustion process for reducing nitrogen oxides in which combustion occurs successively in at least three combustion zones, an incomplete combustion zone, a reducing combustion zone, and a complete combustion zone, respectively, said combustion zones corresponding to primary burners, secondary burners and air ports or after-burners, successively arranged in the direction of the resulting gas stream in a combustion chamber.

Two-stage combustion of nitrogen-containing fuel with low $NO_x$ emissions in a combustion chamber is also taught by U.S. Pat. No. 5,002,483 wherein first, precombustion is performed in a primary stage under fuel-rich conditions and, subsequent, post combustion is performed in a secondary stage under fuel-lean conditions and an inert substance is supplied to the primary stage to cool the walls of the combustion chamber and maintain the combustion zone remote from the walls. See also related U.S. Pat. No. 5,052,919.

U.S. Pat. No. 5,139,414 teaches a burner having opposed nozzles positioned adjacent an exit opening of a fuel supply passage defined by a combustion chamber wall and secondary air supply ports defined by the combustion chamber wall adjacent the exit of the combustion chamber to provide a primary combustion zone in which a substantial portion of the combustion occurs and a secondary combustion zone in which unburned components from the primary combustion zone are substantially completely burned.

Finally, U.S. Pat. No. 4,054,028 teaches a fuel combustion apparatus having a double-shell construction, a fuel injection valve and first air supply port equipped with swirl blades surrounding the fuel injection valve at the upstream end of the apparatus and secondary air supply ports in the downstream end of the combustion apparatus.

In addition to the use of staged combustion, the use of flame inserts for reducing $NO_x$ emissions, particularly in atmospheric-type burners is generally known. U.S. Pat. No. 4,525,141 teaches an atmospheric-type burner having a flame insert which reduces the peak flame temperatures experienced in the combustion process by radiating heat away from the flame, thereby depressing the reaction kinetics associated with the fixation of atmospheric nitrogen. The flame insert includes flame guiding and cooling portions which include at least one insert surface for contacting the array of flames of the burner when the array assumes its normal combustion position in accordance with the flame directions of the individual flames or flamelets under the influence of their natural buoyancy during combustion. The flame insert consists of a pair of substantially circular ring insert elements of different diameters which are concentrically disposed about an array of ports of the atmospheric burner assembly. The insert elements include insert surfaces located adjacent the inner cones of the flame when the array of flames assumes its normal combustion position. The insert surfaces are spaced from one another with the inner cones of the flames extending between and engaging the insert surfaces during combustion. Related U.S. Pat. No. 4,629,415 teaches a flame insert for use with range top burners to regulate and reduce $NO_x$ emissions which includes a flame engaging portion and a support portion which mounts the insert to the burner and accurately positions the flame engaging portion adjacent to the burner ports.

SUMMARY OF THE INVENTION

It is an object of this invention to provide a low $NO_x$ combustion system for natural-gas-fired appliances.

This and other objects of this invention are achieved by a combustion apparatus comprising at least one combustion chamber wall defining a combustion chamber, combustion means for burning a fuel-rich mixture of a fuel and a primary oxidant to form a primary combustion zone within the combustion chamber, flame guide means for attachment and cooling of the primary combustion zone flame disposed within the combustion chamber, and secondary oxidant means for introducing a secondary oxidant into the combustion chamber downstream of the combustion means, whereby combustion gases are entrained into the primary combustion zone, thereby establishing an internal recirculation zone within the combustion chamber.

A staged-air combustion process which achieves these objectives in accordance with one embodiment of this invention comprises introducing a fuel-rich, fuel/air mixture through combustion means comprising an inspirator mixer and a flame holder disposed downstream of the inspirator mixer into a combustion chamber, forming a fuel-rich primary combustion zone flame, attaching the fuel-rich primary combustion zone flame to a flame guide, removing heat from the primary combustion zone flame, and introducing secondary combustion air into the combustion chamber downstream of the flame holder. Combustion gas recirculation into the primary combustion zone, which is established by the geometry of the burner and combustion chamber, improves flame stability and suppresses flame temperature. In accordance with a preferred embodiment of this invention, the flame guide for attaching the fuel-rich primary combustion zone flame is disposed substantially parallel to the longitudinal axis of the primary combustion zone flame or angled toward the longitudinal axis of the primary combustion zone flame in a direction extending away from the combustion means, and one of abutting the exit of the flame holder and extending from behind the exit of the flame holder.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
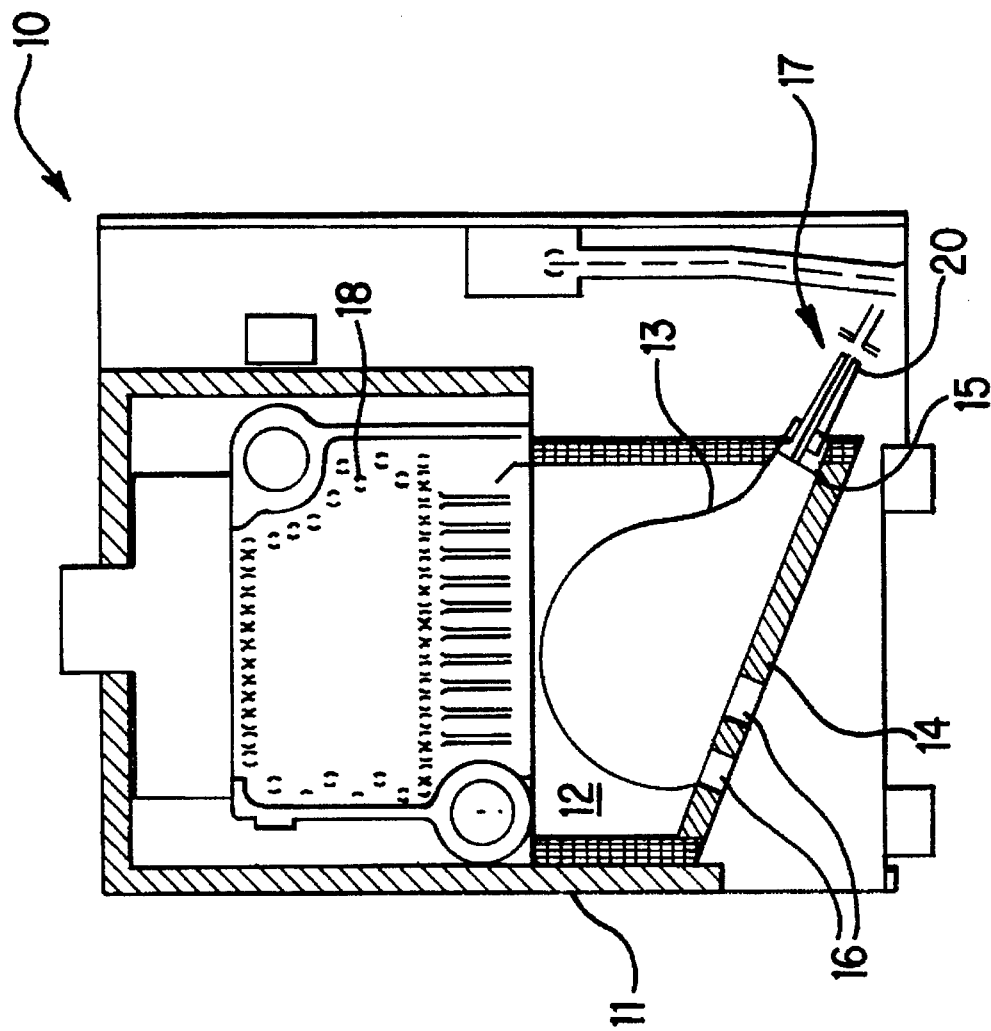
FIG. 1 is a schematic diagram in partial cross-section of a cast-iron boiler application of the combustion apparatus and process in accordance with one embodiment of this invention.
Figure 3:
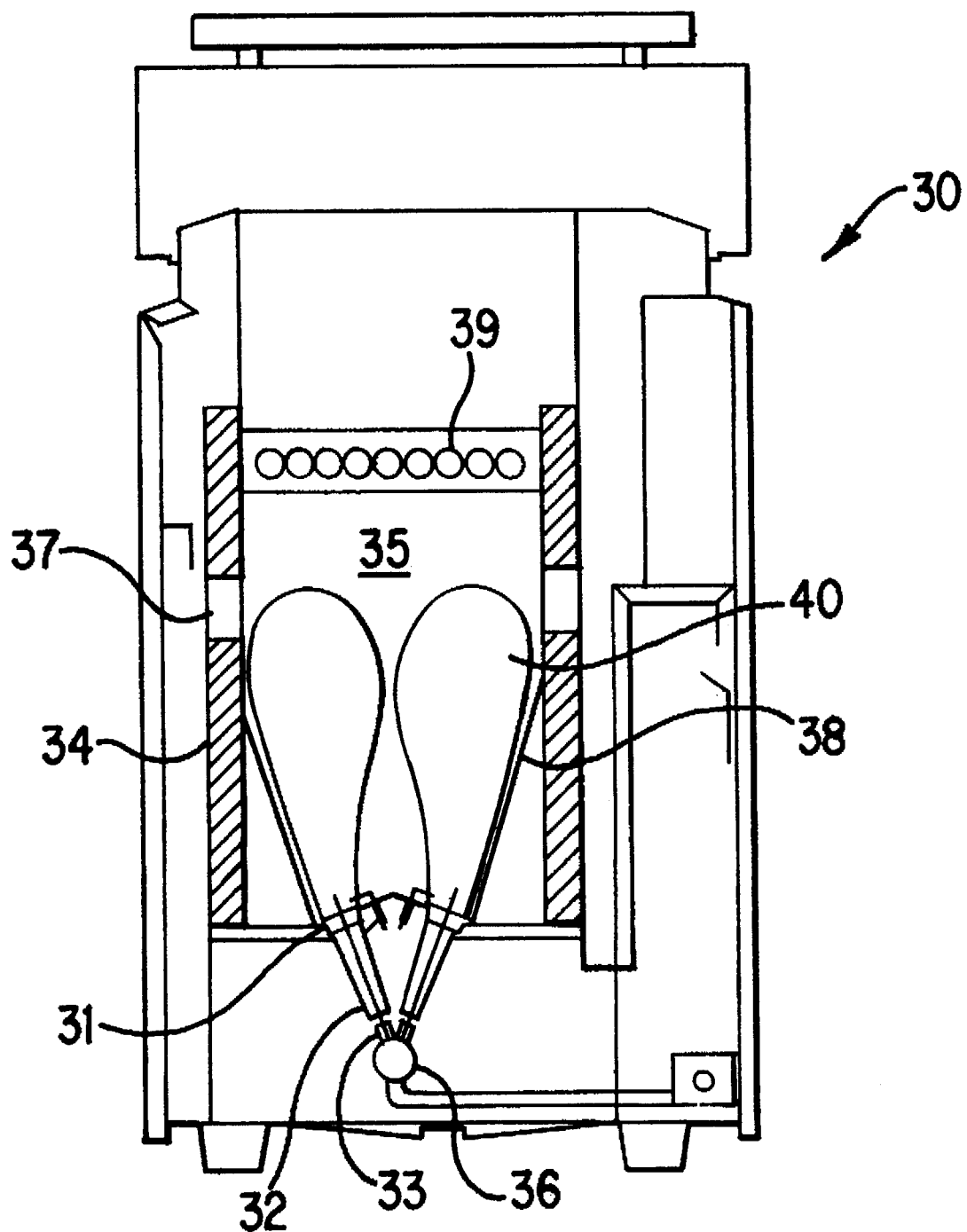
FIG. 3 is a schematic diagram in partial cross-section of a finned-tube boiler application of the combustion apparatus and process in accordance with another embodiment of this invention.
Figure 4:
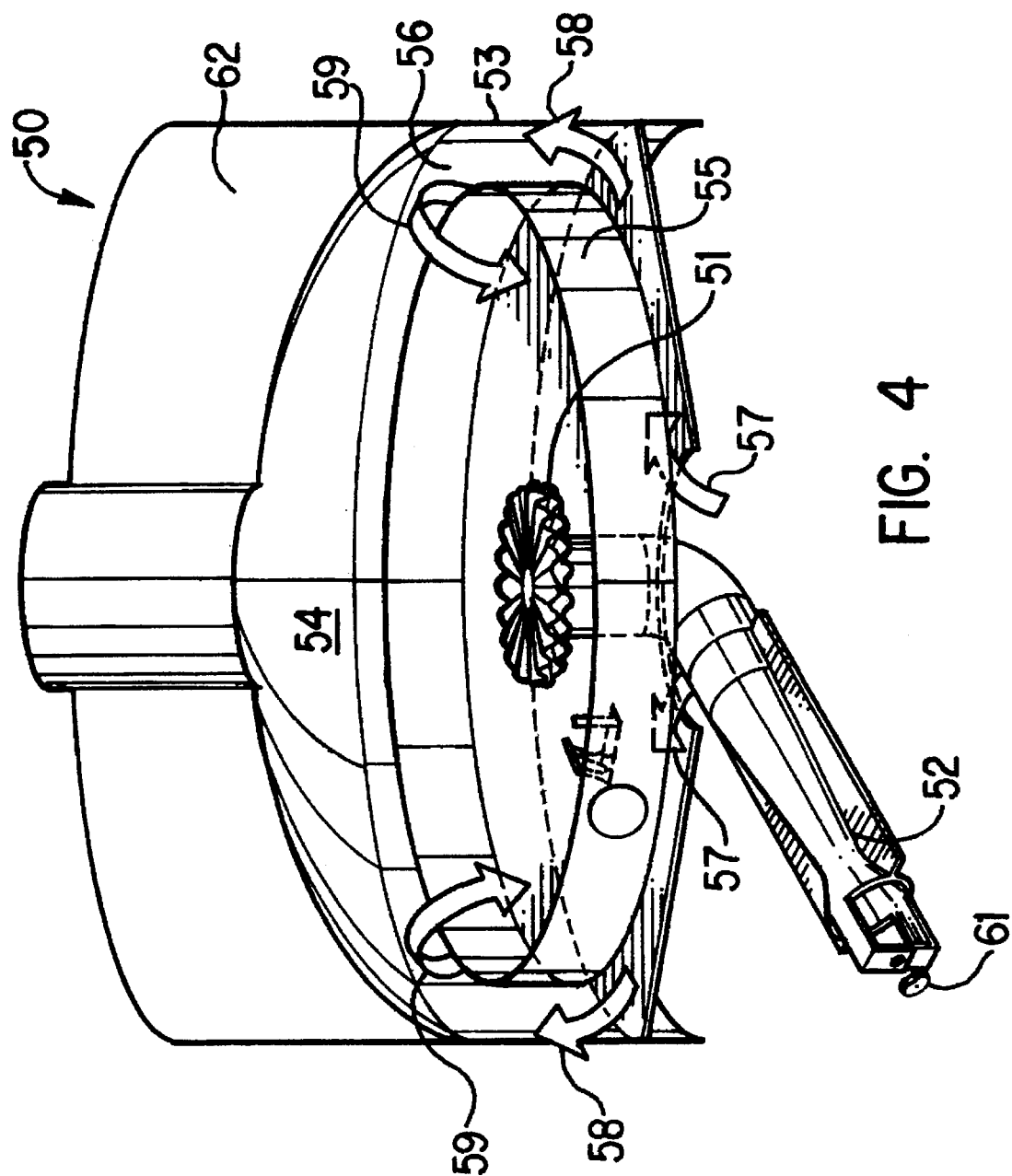
FIG. 4 is a schematic diagram of a water heater application of the combustion apparatus and process in accordance with yet another embodiment of this invention.

The combustion apparatus and process of this invention comprise three basic elements which can be applied to a broad range of appliances, namely (1) air staging, (2) attachment of the primary flame on a flame guide for flame positioning and cooling, and (3) recirculation of combustion products into the primary flame zone. FIGS. 1, 3 and 4 show three embodiments of the combustion apparatus and process of this invention, a cast-iron boiler, a finned-tube boiler, and a water heater, respectively. Each of these embodiments employ the combination of three key aspects of the combustion apparatus and process of this invention for achieving low $NO_x$ emissions—natural draft, venturi-type burners with flame holders designed to stabilize a fuel-rich primary combustion stage, attachment of the primary combustion zone flame or flames to a combustion chamber floor or wall which functions as a flame guide that positions the flame, cools the flame, and establishes desired recirculation patterns in the combustion chamber, and secondary air ports that establish the velocity and position of secondary air jets to complete combustion of the fuel in a secondary combustion stage or zone.

The staged-air combustion process for reducing $NO_x$ in accordance with one embodiment of this invention takes place in two successive stages of air addition into the combustion chamber. In the first step of the process, a fuel-rich fuel/air mixture is introduced through combustion means comprising an inspirator mixer and a flame holder into a combustion chamber, forming a premixed flame at a fuel-to-air ratio richer than stoichiometric, that is, an equivalence ratio, $(fuel/air)_{actual}/(fuel/air)_{stoichiometric}$, in the range of about 1.2–1.6. The primary combustion zone flames are stabilized on a flame holder which is located at the downstream end of the inspirator mixer, that is, downstream of the venturi. The fuel-to-air ratio is established by the geometries of the flame holder and the venturi. The geometry of the flame holder—total open area, hole diameters, thickness, and hole spacing—is critical to establishing a stable flame with low emissions that does not flash back or blow off.

In the second step of the process, the fuel-rich primary combustion zone flame is immediately attached to a flame guide to provide cooling of the flame and prevent flow of secondary combustion air back into the base of the flame. This is accomplished by positioning of the venturi/flame holder combination, that is, the burner, such that the primary combustion zone flame immediately contacts and attaches to the flame guide. The flame guide is a flat or curved plate structure of ceramic or metal that is disposed under the burner and is positioned approximately parallel to the primary combustion zone flame extending from the burner. In accordance with one embodiment of this invention, the flame guide, in the form of a combustion chamber floor, side wall, or other surface, is angled slightly toward the primary combustion zone flame. The flame guide cannot be angled away from the primary combustion zone flame because the primary combustion zone flame will not attach reliably to the flame guide in that position.

Attachment of the fuel-rich primary combustion zone flame to the flame guide, as previously stated, positions the flame in a way that prevents the flow of secondary air to the burner face, critical to effecting the staging of the combustion process which, in turn, is the primary $NO_x$ control mechanism for the burner. In addition, the flame guide provides a large surface area for radiating heat from the primary combustion zone flame to a heat exchanger, thereby reducing flame temperature and inhibiting the formation of $NO_x$. To inhibit the formation of $NO_x$, it is critical that this heat removal occurs in the primary combustion zone.

Finally, the attachment of the primary combustion zone flame to the flame guide spreads the flame in a manner such that, in certain applications, flames from multiple burners merge into a sheet of flame, providing uniformity of mixing of secondary combustion air into the flame sheet in the secondary combustion zone and improving the uniformity of heat flux from the flame guide to the heat exchanger.

After removal of heat from the primary combustion zone flame, secondary air is introduced at locations within the combustion chamber selected to minimize $NO_x$ and CO emissions, depending on the particular application of the process of this invention. The location of the secondary air introduction also influences the flue gas recirculation pattern in the combustion chamber. The size and location of secondary combustion air openings are designed to effect rapid mixing of secondary combustion air with the fuel-rich primary combustion zone flame. The sizes of the openings are selected to create jets of secondary air which entrain the primary combustion zone flame. Secondary combustion zone flames resulting from the introduction of secondary combustion air into the combustion chamber downstream of the flame holder can be anchored on the edges of the openings or slightly lifted therefrom, where the openings are disposed in the flame guides.

After introduction of the secondary combustion air into the combustion chamber, the overall equivalence ratio in the combustion chamber is lean, in the range of about 0.5 to about 0.8.

The geometry of the flame guide and the geometry and location of the secondary combustion air openings in the combustion chamber establish the overall recirculation pattern of combustion products in the combustion chamber. The recirculation of combustion products to the burner face enhances flame stability and reduces the formation of $NO_x$. As previously stated, in accordance with one embodiment of this invention, the secondary combustion air is introduced into the combustion chamber through at least one secondary port formed by the flame guide. Secondary combustion air may also be introduced through slots or gaps formed between the edge of the flame guide and either the wall of the combustion chamber or the surface of the heat exchanger.

In accordance with a particularly preferred embodiment of this invention, the secondary combustion air is introduced into the combustion chamber without benefit of a forced draft blower or induced draft fan. However, such mechanical means may be used without degrading the $NO_x$ control effectiveness of the staged-air combustion process of this invention.

Critical elements of the low $NO_x$ combustion apparatus of this invention comprise burner design - venturi design and flame holder port loading and opening pattern, position of the flame guide with respect to the burners and heat exchanger, and secondary combustion air opening area, pattern, and location.

Figure 2:
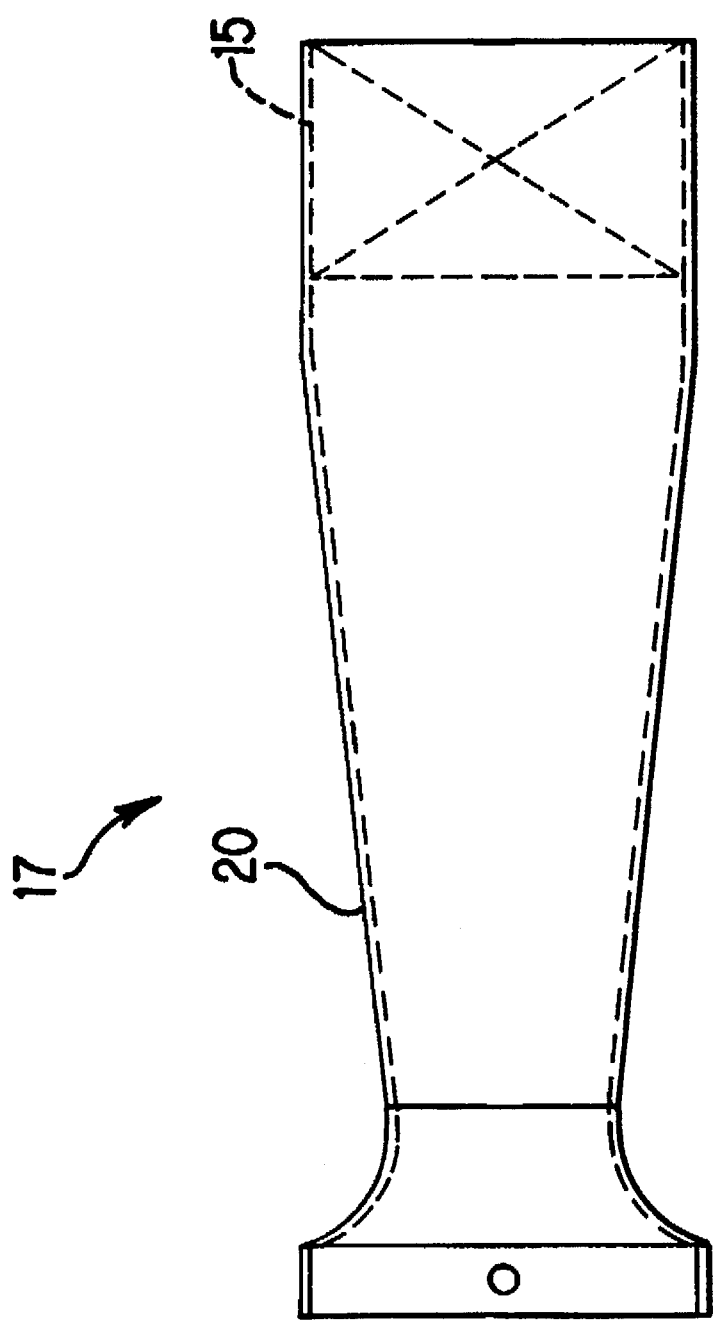
FIG. 2 is a side view of an in-shot burner for a combustion apparatus in accordance with one embodiment of this invention.

FIG. 1 shows a cast-iron boiler configuration of a combustion apparatus in accordance with one embodiment of this invention comprising at least one combustion chamber wall 11 defining combustion chamber 12. Combustion means for burning a fuel-rich mixture of a fuel and a primary oxidant to form a primary combustion zone flame 13 within combustion chamber 12 comprises in-shot burner 17, as shown in FIG. 2, comprising venturi 20 and flame holder 15 disposed at a downstream end of venturi 20. In-shot burner 17 is designed to provide axial discharge of primary combustion zone flame 13. In accordance with another embodiment of this invention, as shown in FIG. 4, flame holder 51 disposed at the discharge end of venturi 52 provides radial discharge of the primary combustion zone flame into the combustion chamber 54.

Venturis 20, 32, 52 are designed to provide the desired primary fuel/air ratio. The desired equivalence ratio for optimum appliance operation varies by appliance but, preferably, is in the range of approximately 1.2 to 1.6.

Figure 7:
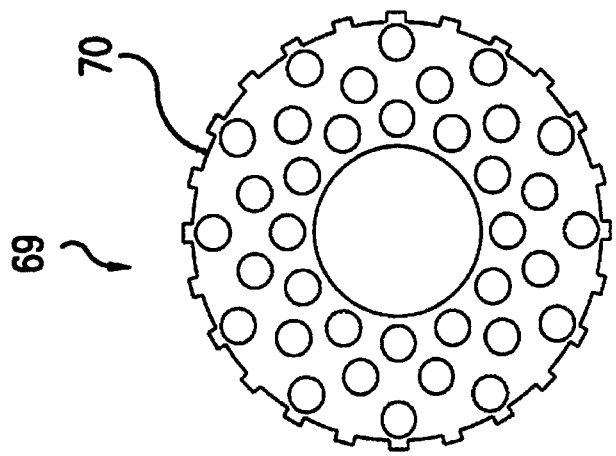
FIG. 7 shows an end view of a flame holder for a combustion apparatus in accordance with another embodiment of this invention.
Figure 6:
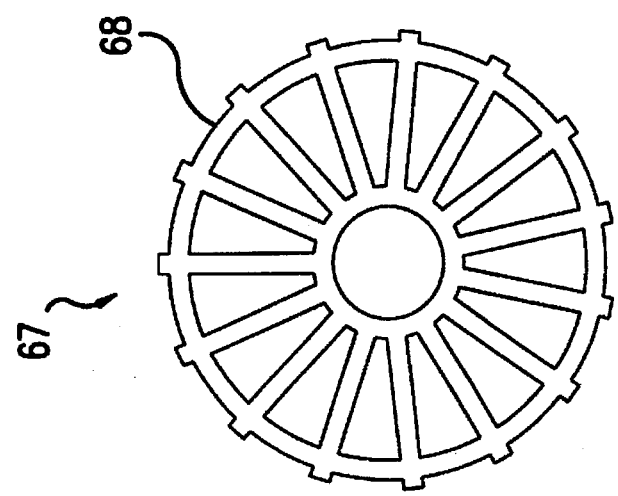
FIG. 6 shows an end view of a flame holder for a combustion apparatus in accordance with another embodiment of this invention.
Figure 5:
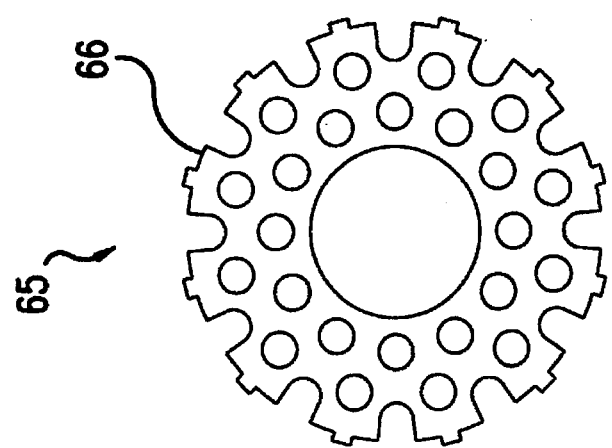
FIG. 5 shows an end view of a flame holder for a combustion apparatus in accordance with one embodiment of this invention.

Flame holder design is critical to the achievement of acceptable flame stability. The port loading of the burners, defined as the firing rate divided by the open area of the flame holder, is preferably in the range of about 10,000–25,000 Btu/hr*$in^2$. This port loading provides adequate trade-off between flame blow off and flash back. Examples of flame holders for in-shot burners in accordance with three embodiments of this invention are shown in FIGS. 5, 6 and 7, FIGS. 5 and 7 showing round-hole in-shot burner flame holders 65 and 69 and FIG. 6 showing vane-type in-shot burner flame holder 67. One critical design element of all three in-shot burner flame holders 65, 67, 69 is the set of openings 66, 68, 70 on the periphery of the flame holders for flame attachment. A radial port flame holder 51 in accordance with one embodiment of this invention is shown in FIG. 4.

Flame guide means for attachment and cooling of the primary combustion zone flame 13 within combustion chamber 12, as shown in FIG. 1, comprises flame guide 14 which is, in accordance with one embodiment of this invention, a ceramic or metal plate that is positioned in a way such that primary combustion zone flame 13 attaches to the surface of flame guide 14. In accordance with a preferred embodiment of this invention, flame guide 14 is positioned at a distance between about 0 inches and about 0.50 inches from the periphery of flame holder 15. Flame guide 14 in accordance with one embodiment of this invention is disposed parallel to the longitudinal axis of in-shot burner 17. In accordance with another embodiment of this invention, flame guide 14 is angled slightly toward the longitudinal axis of in-shot burner 17 in a direction away from in-shot burner 17. In accordance with both embodiments, flame guide 14 abuts the exit of the flame holder 15 or extends from behind the exit of the flame holder 15. It should be noted that angling of flame guide 14 away from the longitudinal axis of in-shot burner 17 will result in lifting off of primary combustion zone flame 13 from the surface of flame guide 14.

Secondary oxidant means for introducing a secondary oxidant into combustion chamber 12 downstream of in-shot burner 17 comprises flame guide 14 having at least one secondary oxidant opening 16.

FIG. 3 shows a combustion apparatus for a finned-tube boiler in accordance with one embodiment of this invention comprising combustion chamber wall 34 which forms combustion chamber 35. Gas manifold 36 provides fuel, preferably natural gas, to a plurality of in-shot burners comprising gas spud 33 through which the fuel flows into venturi 32. As in the embodiment shown in FIG. 1, flame holder 31 provides an axial primary combustion zone flame 40. Flame guide 38 is disposed substantially parallel to the longitudinal axis of primary combustion zone flame 40. In accordance with this embodiment of the combustion apparatus of this invention, secondary oxidant is introduced through secondary oxidant openings 37 formed by combustion chamber wall 34 adjacent to and downstream of flame guide 38.

FIG. 4 shows a water heater configuration of the combustion apparatus of this invention comprising combustion chamber wall 53 which defines combustion chamber 54. The combustion means for burning a fuel-rich mixture of a fuel and a primary oxidant to form a primary combustion zone flame within combustion chamber 54 in accordance with this embodiment of the invention comprises gas spud 61 through which the fuel flows into venturi 52 and through the radial ports of radial flame holder 51. The flame guide means for attachment and cooling of the primary combustion zone flame comprises flame guide 55 which is disposed at a distance from combustion chamber wall 53 forming annular secondary oxidant gap 56 between flame guide 55 and combustion chamber wall 53 through which secondary oxidant is introduced as indicated by arrows 57, 58, and 59 into combustion chamber 54.

To provide for the necessary removal of heat from the primary combustion zone flame, the combustion apparatus of this invention further comprises heat exchanger 18, 39, 62 disposed in radiative heat transfer communication with flame guide 14, 38, 55. Flame guide 14, 38, 55 is preferably positioned relative to heat exchanger 18, 39, 62 in a manner which maximizes the radiative view factor between flame guide 14, 38, 55 and heat exchanger 18, 39, 62.

In addition, it is critical that the disposition of the secondary oxidant openings relative to the flame guide be such that there is sufficient distance between the secondary oxidant openings and the heat exchanger for the secondary oxidant to completely mix with and burn the combustible gas from the primary combustion zone before the gases contact the heat exchanger surface.

The overall secondary oxidant port area, the distance between the burners and the secondary oxidant ports, and the geometry and location of the secondary oxidant ports are all critical to effective control of $NO_x$ and CO emissions. Overall secondary oxidant port area affects the overall excess oxidant introduced into the combustion chamber, the velocity of the oxidant jets, and the primary/secondary oxidant split between the venturis and the secondary oxidant ports. In accordance with a preferred embodiment, the overall secondary oxidant port area is reduced to the point that overall excess oxidant is approximately 20–100%.

In accordance with another preferred embodiment of this invention, the distance between the burners and the secondary oxidant ports is in the range of about 6 inches to about 13 inches. In a particular application, the longer the length of the primary combustion zone, the lower the $NO_x$ and the more difficult it becomes to burn out CO.

In accordance with a particularly preferred embodiment of this invention, the secondary oxidant ports are rectangular in shape with dimensions of about 1.5–2.5 inches long and about 0.25 to 0.5 inch wide. The long direction of the rectangle is aligned with the flow direction of the flame. One or more rows of secondary oxidant ports may be effective in introducing the secondary oxidant to the flame. Alternatively, in the case of water heater 50 shown in FIG. 4, the secondary oxidant port is an annular ring shape, approximately 16 inches in diameter and about 1 inch wide.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A combustion apparatus comprising:

at least one combustion chamber wall defining a combustion chamber;

combustion means for burning a fuel-rich mixture of a fuel and a primary oxidant to form a primary combustion zone flame within said combustion chamber;

flame guide means for attachment and cooling of said primary combustion zone flame disposed within said combustion chamber; and secondary oxidant means for introducing a secondary oxidant into said combustion chamber downstream of said combustion means whereby products of combustion are recirculated into said primary combustion zone flame.

2. A combustion apparatus in accordance with claim 1, wherein said combustion means comprise a venturi and a flame holder, said flame holder disposed at a downstream end of said venturi.

3. A combustion apparatus in accordance with claim 2, wherein said flame holder provides an axial discharge of said primary combustion zone flame.

4. A combustion apparatus in accordance with claim 2, wherein said flame holder provides a radial discharge of said primary combustion zone flame.

5. A combustion apparatus in accordance with claim 2, wherein said flame guide means comprises at least one flame guide disposed one of substantially parallel to a longitudinal axis of said primary combustion zone flame and angled toward said longitudinal axis in a direction away from said combustion means, and one of abutting the exit of the flame holder and extending from behind the exit of said flame holder.

6. A combustion apparatus in accordance with claim 5, wherein said secondary oxidant means comprises said at least one flame guide having at least one secondary oxidant opening.

7. A combustion apparatus in accordance with claim 5, wherein said secondary oxidant means comprises said at least one flame guide disposed at a distance from said at least one combustion chamber wall forming a gap between said at least one flame guide and said at least one combustion chamber wall through which secondary oxidant is introduced into said combustion chamber.

8. A combustion apparatus in accordance with claim 5, wherein said secondary oxidant means comprises said at least one combustion chamber wall having at least one opening through which secondary combustion air is introduced directly into said combustion chamber.

9. A combustion apparatus in accordance with claim 5, wherein said at least one flame guide is disposed at a distance between about 0 inches and about 0.50 inches from the periphery of said flame holder.

10. A combustion apparatus in accordance with claim 5 further comprising a heat exchanger disposed in radiative heat transfer communication with said at least one flame guide.

11. A staged-air combustion process for a fluid heater or boiler comprising the steps of:

introducing a fuel-rich, fuel/air mixture through combustion means comprising an inspirator mixer and a flame holder disposed downstream of said inspirator mixer into a combustion chamber, forming a fuel-rich primary combustion zone flame;

attaching said fuel-rich primary combustion zone flame to a flame guide disposed one of substantially parallel to a longitudinal axis of said primary combustion zone flame and angled toward said longitudinal axis in a direction away from said combustion means, and one of abutting the exit of the flame holder and extending from behind the exit of said flame holder;

removing heat from said primary combustion zone flame;

introducing secondary combustion air into said combustion chamber downstream of said flame holder; and recirculating combustion products into said primary combustion zone flame.

12. A staged-air combustion process in accordance with claim 11, wherein the equivalence ratio of said fuel-rich, fuel/air mixture is in the range of about 1.2 to about 1.6.

13. A staged-air combustion process in accordance with claim 11, wherein introduction of said secondary combustion air results in an overall fuel-to-air ratio in the range of about 0.5 to about 0.8.

14. A staged-air combustion process in accordance with claim 11, wherein said flame holder has a port loading rate of about 10,000 to about 25,000 Btu/hr*$in^2$.

15. A staged-air combustion process in accordance with claim 11, wherein a surface of said flame guide facing said primary combustion zone flame is disposed between 0 and about 0.50 inches from the periphery of said flame holder.

16. A staged-air combustion process in accordance with claim 11, wherein said secondary air is introduced into said combustion chamber downstream of said flame holder through at least one secondary air port formed by said flame guide.

17. A staged-air combustion process in accordance with claim 16, wherein said secondary air port has a rectangular shape with the long side of said rectangle aligned substantially parallel to the direction of flow of said primary combustion zone flame.

18. A staged-air combustion process in accordance with claim 11, wherein said fuel-rich, fuel/air mixture is introduced axially through said flame holder into said combustion chamber.

19. A staged-air combustion process in accordance with claim 11, wherein said fuel-rich, fuel/air mixture is introduced radially through said flame holder into said combustion chamber.

* * * * *